US005469506A

United States Patent [19]

Berson et al.

[11] Patent Number: 5,469,506

[45] Date of Patent: Nov. 21, 1995

[54] APPARATUS FOR VERIFYING AN IDENTIFICATION CARD AND IDENTIFYING A PERSON BY MEANS OF A BIOMETRIC CHARACTERISTIC

[75] Inventors: William Berson, Westport; Kenneth C. Zemlok, Shelton, both of Conn.

[73] Assignee: Pitney Bowes Inc., Stamford, Conn.

[21] Appl. No.: 265,872

[22] Filed: Jun. 27, 1994

[51] Int. Cl.$^{6}$ .............................. H04L 9/32; H04L 9/00; H04L 9/30

[52] U.S. Cl. .............................. 380/23; 380/9; 380/25; 380/30; 380/49; 380/50; 380/54; 235/379; 235/380; 382/115

[58] Field of Search .............................. 380/23–25, 9, 380/30, 49, 50, 54; 235/380, 379; 382/2–6; 340/825.31, 825.34

[56] References Cited

U.S. PATENT DOCUMENTS

| | | | |
|---|---|---|---|
| 4,853,961 | 8/1989 | Pastor | 380/21 |
| 4,879,747 | 11/1989 | Leighton | 380/23 |
| 4,991,205 | 2/1991 | Lemelson | 380/5 |
| 4,993,068 | 2/1991 | Piosenka | 380/23 |
| 4,995,081 | 2/1991 | Leighton | 380/23 |
| 5,053,608 | 10/1991 | Senanayake | 235/380 |
| 5,337,358 | 8/1994 | Axelrod et al. | 380/23 |
| 5,384,846 | 1/1995 | Berson et al. | 380/23 |
| 5,420,924 | 5/1995 | Berson et al. | 380/23 |

OTHER PUBLICATIONS

Special Report: Biometrics; Vital Signs of Identity; IEEE Spectrum Feb. 1994 vol. 31 No. 2.
Inforite Corporation; Signature Verification, MP100 Rite Verification.

*Primary Examiner*—Bernarr E. Gregory
*Attorney, Agent, or Firm*—Robert H. Whisker; Melvin J. Scolnick

[57] ABSTRACT

A biometric is a substantially stable physical or behavioral characteristics of a person which can be automatically measured and characterized for comparison. In accordance with the subject invention an identification card includes an encrypted representation of the biometric characteristic, which may be a finger print or a description of the manner in which the person signs his or her name, including the order and velocity in which strokes comprising a signature are written. The identification card is validated, and the person identified by an apparatus including a scanner which simultaneously scans two fields. The card is position in the first field and the biometric (e.g. a thumbprint) is simultaneously positioned in the second field and both are scanned at once, to produce a composite signal including both the code of representation and the scanned biometric. A microprocessor separates the composite signal, decodes the coded representation, and compares it to the stand biometric to validate the card. By simultaneously scanning both the coded representation and the biometric with a single scanner the cost of the apparatus is reduced as is the opportunity for a breach of security.

13 Claims, 6 Drawing Sheets

APPARATUS FOR VERIFYING AN IDENTIFICATION CARD AND IDENTIFYING A PERSON BY MEANS OF A BIOMETRIC CHARACTERISTIC

BACKGROUND OF THE INVENTION

The subject invention relates to an apparatus for verifying an identification card and for confirming the identity of the person presenting the card.

U.S. patent application Ser. No. 08/175,001, by William Berson et al, filed Dec. 29, 1993 discloses an apparatus for verifying an identification card, where the card includes an image of an object or person to be identified on a first portion of the card in human recognizable form, and a coded representation of an encrypted signal comprising a representation of the image on a second portion of the card. In one embodiment of the invention of this application the coded representation is in the form of a two dimensional barcode. The apparatus of this invention scans the coded representation, decrypts it, and displays it so that the displayed image can be compared both with the image on the card and with the person presenting the card, simultaneously validating the card and confirming the identity of the person.

While the invention of the above-mentioned application is believed highly satisfactory for its intended purpose, in any application it is desirable to eliminate or reduce the need for the judgment of a human operator to compare images. One known means for such identification is to automatically scan a biometric of a person and to compare the scanned biometric with a database of preestablished metrics to confirm the persons identity.

(By "biometric" herein is meant a substantially stable physical characteristic of a person which can be automatically measured and characterized for comparison. Such biometrics include fingerprints, palm prints, retinal prints, and facial characteristics. Biometrics may also include behavioral characteristics, such as the manner in which a person writes his or her signature. By "metric" herein is meant some set of data which can be automatically compared to the scanned biometric. A metric may be a recorded digital image of the biometric which is compared to the scanned biometric by cross-correlation. More typically, a metric is a recorded set of characteristics or measurements which can be repeated on the scanned biometric and compared with the recorded set.)

Automatic comparison of human biometrics is well known in the art, as evidenced by, the article "Vital Signs of Identity", IEEE Spectrum, pgs. 22–30, February 94, and need not be discussed further here for an understanding of the subject invention.

U.S. Pat. Nos. 4,991,205 to: Lemelson; 4,993,068 to: Piosenka et al., and 4,995,081 to: Leighton et al., teach various schemes for recording biometrics on an identification card and using that card confirm the identity of a person carrying a card. Heretofore, one disadvantage with such systems has been the need for two separate mechanisms to the comparison device. One mechanism is necessary to recover the recorded biometric from the card, while a second is used, to scan the biometric characteristic of the person presenting the card. This, of course, presents a clear disadvantage in terms of cost. Perhaps more importantly, however, it presents a serious opportunity for a breach of security in an unattended system, or where there is collusion with an operator, by bypassing the scanner which is intended to scan the biometric characteristic. If, for example, a photograph of a fingerprint can be obtained it would be possible to create a digital representation of that photograph which would be substantially identical to the digital signal produced by the scanner. By bypassing the scanner and inputting the false digital signal the automatic comparison device could be defeated.

Thus it is an object of the subject invention to provide an apparatus for validating an identification card and confirming the identity of a person presenting that card by means of a biometric characteristic of that person where that apparatus provides increased security against tampering.

BRIEF SUMMARY OF THE INVENTION

The above object is achieved the disadvantages of the prior art are overcome in accordance with the subject invention by means of an apparatus for verifying identification; the card including an encrypted, scannable indicia representative of a first metric derived from a biometric characteristic of a person to be identified by said card, were the apparatus includes a scanner for scanning a field, the field including first and second sub-fields; a first mechanism for positioning the card with the indicia within the first sub-field; a second mechanism for positioning a corresponding biometric characteristic of a person presenting the card within the second sub-field; and data processing apparatus for controlling the scanner to scan the field when the indicia and the biometric characteristic are positioned within the first and second sub-fields respectively, and for receiving a data image of the field from the scanner. The data processing apparatus partitions the data image into first and second sub-images corresponding to the first and second sub-fields respectively, decodes the first sub-image to recover the encrypted metric, decrypts the encrypted metric to validate it, and compares the second sub-image, corresponding to the biometric characteristic of the person presenting the card, to the metric, and if the comparison is successful outputs the signal indicating that that person is the person to be identified by the card.

In accordance with one aspect of the subject invention the biometric can be a fingerprint.

In accordance with another aspect of the subject invention the biometric can be the manner of writing a signature.

In accordance with another aspect of the subject invention the metric is encrypted.

In accordance with still another aspect of the subject invention the metric can be digitally signed.

(Those skilled in the art will recognize that "digital signatures" provide a means for the use of encryption techniques to validate a message without concealing that message. Encryption, of course, conceals a message from all those who do not have the proper decryption key, and validates a message as having been sent by a person having the proper encryption key. To form a digital signature a "hash" is formed, i.e., an arbitrary sample of the message is taken in a known manner using a known "hash" function, and the hash is encrypted and appended to the message. The message is thus still available to anyone but only a person having the proper key can authenticate it by decrypting the hash, regenerating it from the message, and comparing the two. Or a person can regenerate the hash from the message encrypt it and compare it to the encrypted hash, in either case, validating the message. As used herein descriptions of the decryption and validation of the encrypted metric are intended to include both normal encryption techniques and digital signature techniques.)

In accordance with yet another aspect of the subject invention the metric is encrypted with an encryption key, $E_i$, and the corresponding decryption key, $D_i$ is encrypted with a second encryption key, $E_i$, to form $E_i[D_i]$, which is appended to the encrypted metric and recorded in the indicia. The apparatus of the subject invention stores the decryption key $D_1$ and uses that to recover the decryption key $D_i$ which it then uses to decrypt and validate the encrypted metric.

Thus it can be seen that the above described invention advantageously overcomes the disadvantages of the prior art and achieves the objects set forth above. Other objects and advantages of the subject invention will become apparent to those skilled in the art from consideration of the attached drawings and the detailed description set forth below.

DETAILED DESCRIPTION OF PREFERRED EMBODMIENTS OF THE SUBJECT INVENTION

Figure 1:
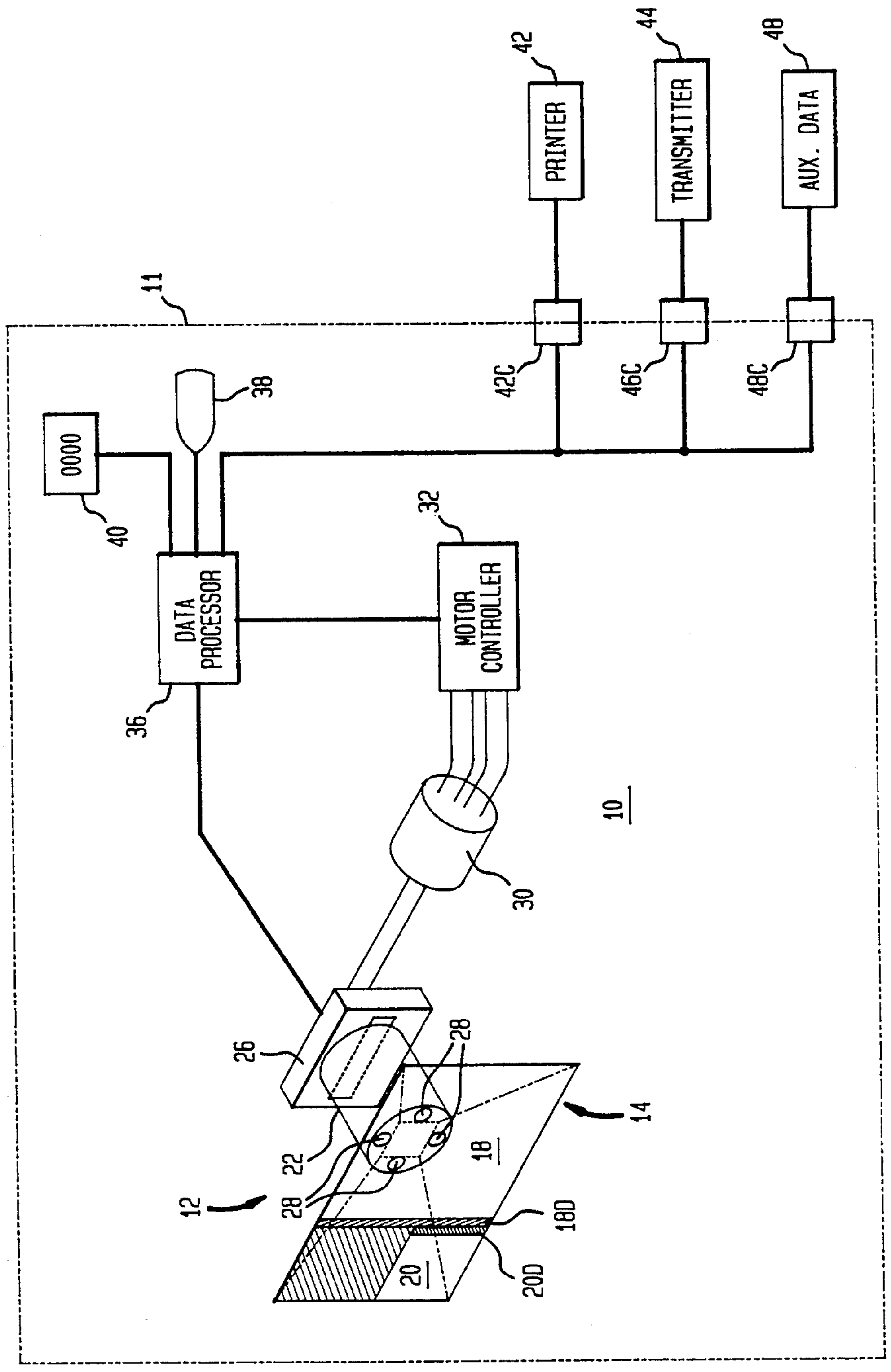
FIG. 1 shows a schematic block diagram of one embodiment of the subject invention.

FIG. 1 shows a block schematic diagram of an apparatus 10 in accordance with a preferred embodiment of the subject invention. Apparatus 10 includes a scanning mechanism 12 for scanning field 14. Field 14 comprises sub-field 18, in which scannable indicia are presented, and sub-field 20, in which a biometric such as a fingerprint is presented. Apparatus 10 can also include delimiting marks 18D and 20D to simplify partitioning of field 14 into sub-fields 18 and 20 as will be described further below.

Scanning mechanism 12 includes conventional optics 22 which focus field 14 onto charge coupled device 26 to generate a digital signal representative of field 14 in a conventional manner which is well understood by those skilled in the art. Scanning mechanism 12 may also include light emitting diodes (LED's) 28, or other conventional sources of illumination, to illuminate field 14 if necessary.

Line CCD 26 scans field 14 a line at a time and is driven in a vertical plane by motor 30 to successively scan a sequence of horizontal lines covering field 14. Motor 30 is controlled by motor controller 32 and data processor 36 in a conventional manner which need not be described further here for an understanding of the subject invention.

Data processor 36 is also connected to a display 38 and soft keys 40 for communication with an operator and can be connected to a printer 42, transmitter 44, and auxiliary data input 48 through connectors 42C, 46C and 48C respectively.

Printer 42 can be used to print a hard copy record of a transaction. Transmitter 44 can be used to communicate with a central facility to, for example, determine if an otherwise valid identification card has expired. Auxiliary data input 48 can be used, for example, where the identification card is also a drivers license which has been validated by a traffic policeman who is writing a traffic ticket, to input speed data from a radar gun. Operation of printer 42, transmitter 44, and auxiliary data input 48 are conventional and well understood by those skilled in the art, and those skilled in the art will readily recognize many other applications for such capabilities. Accordingly, a further description of these elements is not considered necessary to an understanding of the subject invention.

Figure 2:
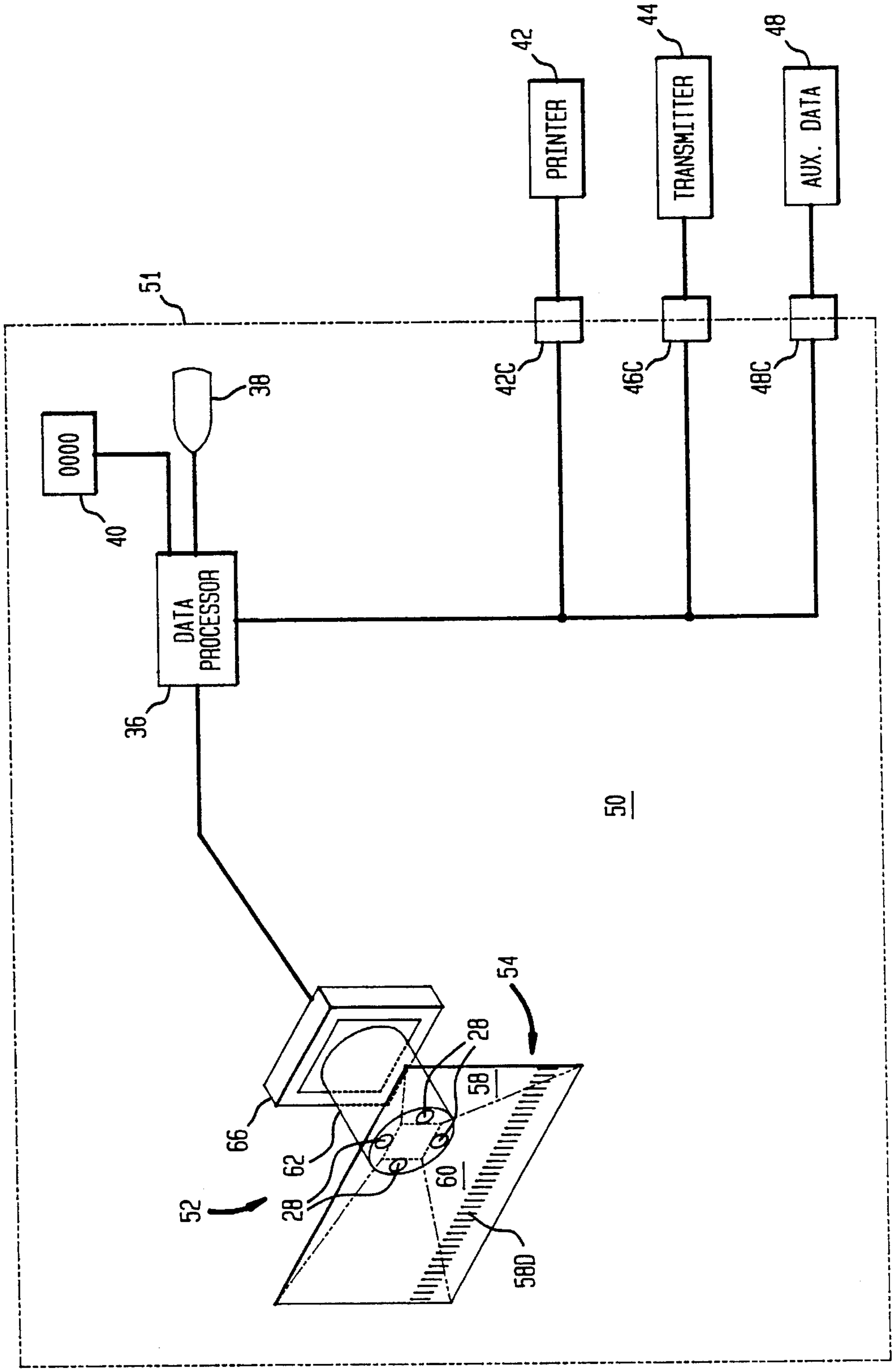
FIG. 2 shows a schematic block diagram of a second embodiment of the subject invention.

FIG. 2 shows another embodiment of the subject invention Wherein a scanning mechanism 52 scans a field 54 which includes sub-fields 58 and 60 and delimiter 58D. In scanning mechanism 52 optics 62 focus all of field 54 on CCD device 66 simultaneously. Device 66 converts the image of field 54 into a digital signal substantially identical to that of device 26 in apparatus 10 and transmits it to data processor 36.

The biometric presented in sub-field 60 is the manner in which the person presenting the identification card writes his or her signature. Note that this includes more than the signature itself, and also includes the sequence and speed with which the various strokes making up the signature are written. Thus, apparatus 50 cannot be deceived by a copied or forged signature. Because of the need to record real time information as the signature is written apparatus 50 includes optics 62 and area CCD 66 to image all of field 54 simultaneously. Those skilled in the art will readily recognize the equivalent high speed scanning devices, such as laser scanners, can also be used for high speed scans in apparatus 50.

Other biometrics which would require high speed scanning would include retinal patterns and facial images which must be scanned quickly before a subject blinks or moves.

It should be understood that, while optics 22 and 62 are shown as single units, fields 18 and 20, and 58 and 60 are not necessarily imaged identically. Depending on the relative positions and sizes of these fields and the desired magnification and resolution fields 20 and 60 may require additional or different optical and or illuminating elements to produce the desired image on scanners 26 and 66. Such modifications would be well within the abilities of those skilled in the optical arts and need not be discussed further for an understanding e,f the subject invention.

Preferably apparatus 10 and 50 include physically secure housings, 11 and 51 to provide a further level of security against tampering with the biometric scan.

Figure 3:
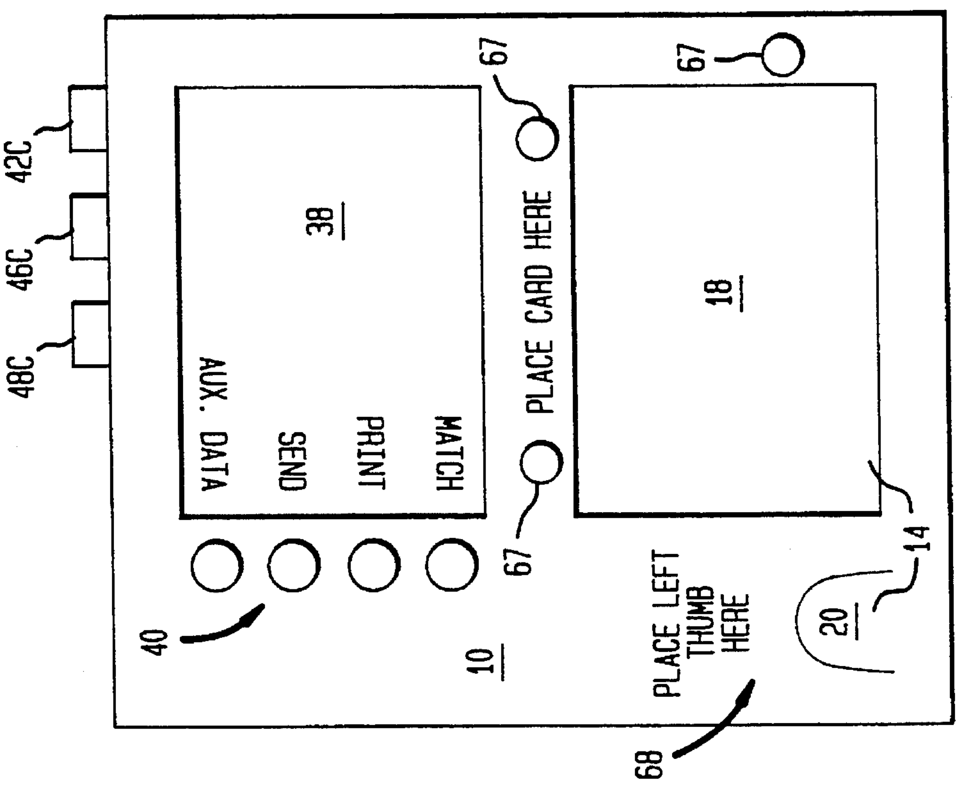
FIG. 3 shows a top plan view of the first embodiment of the subject invention.

FIG. 3 shows a top view of apparatus 10. Indicia and pins 67 are provided to guide a person presenting an identification card in placing the card so that the indicia are within field 18. Indicia 68 are provided to guide that person in placing his or her appropriate fingerprint within sub-field 20. Display 38 displays prompts designating functions for soft keys 40; here "MATCH" to initiate a comparison of the biometric of the person presenting the card and the metric represented in the indicia, "PRINT" to print a hard copy record of the transaction, "SEND" to send a record of the transaction to a central facility, and "AUXILIARY DATA" to input auxiliary data for the transaction, all in a conventional manner as described above.

Display 38 is shown somewhat larger than might otherwise be necessary to allow the possibility of also displaying an image of the person to be identified by the card which is recorded in the indicia to provide a further level of security of identification in a manner similar to that described in co-pending, commonly assigned U.S. application Ser. No. 08/175,001.

Figure 4:
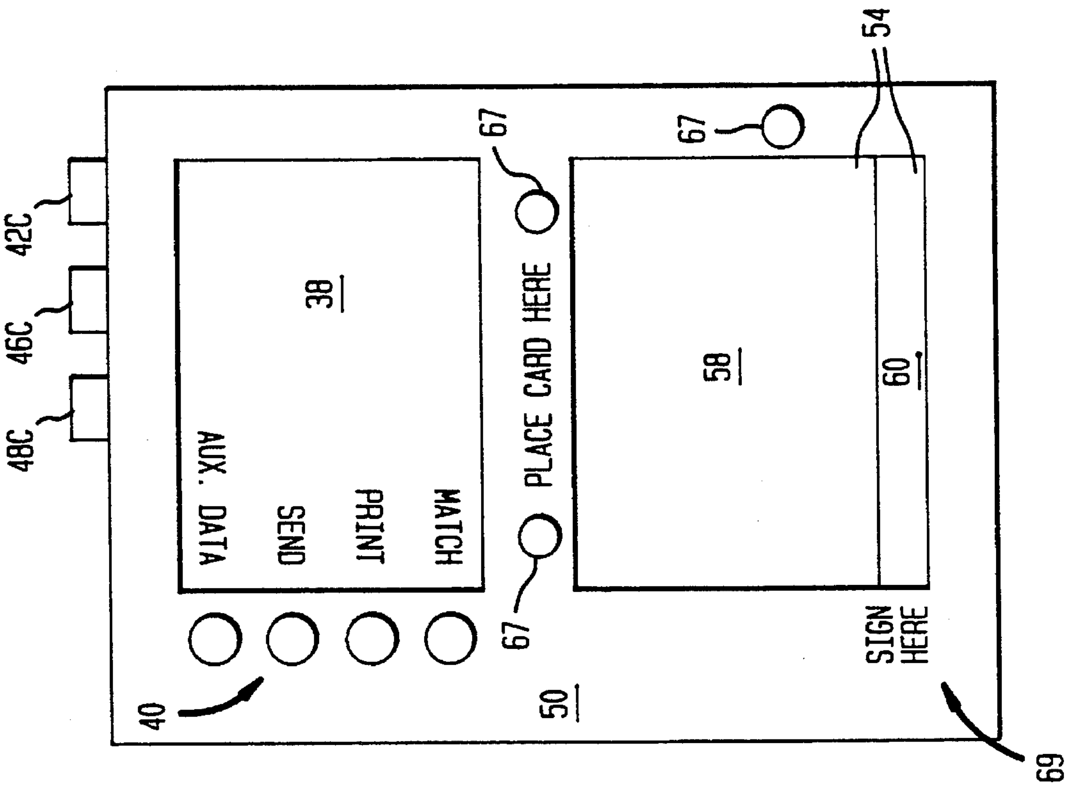
FIG. 4 shows a top plan view of the second embodiment of the subject invention.

FIG. 4 shows a top view of apparatus 50, which is substantially similar to apparatus 10 in appearance and operation except that sub-field 58 is positioned above sub-field 60 and sub-field 60 is configured so that the person presenting the card can sign his or her signature in sub-field 60. Because apparatus 50 scans the entire field 54 at a high rate of speed the real time direction and speed in which the strokes comprising the signature are written can be recorded. To facilitate this a stylus (not shown) having a reflective or otherwise highly contrasting tip can be provided for writing the signature.

Figure 5:
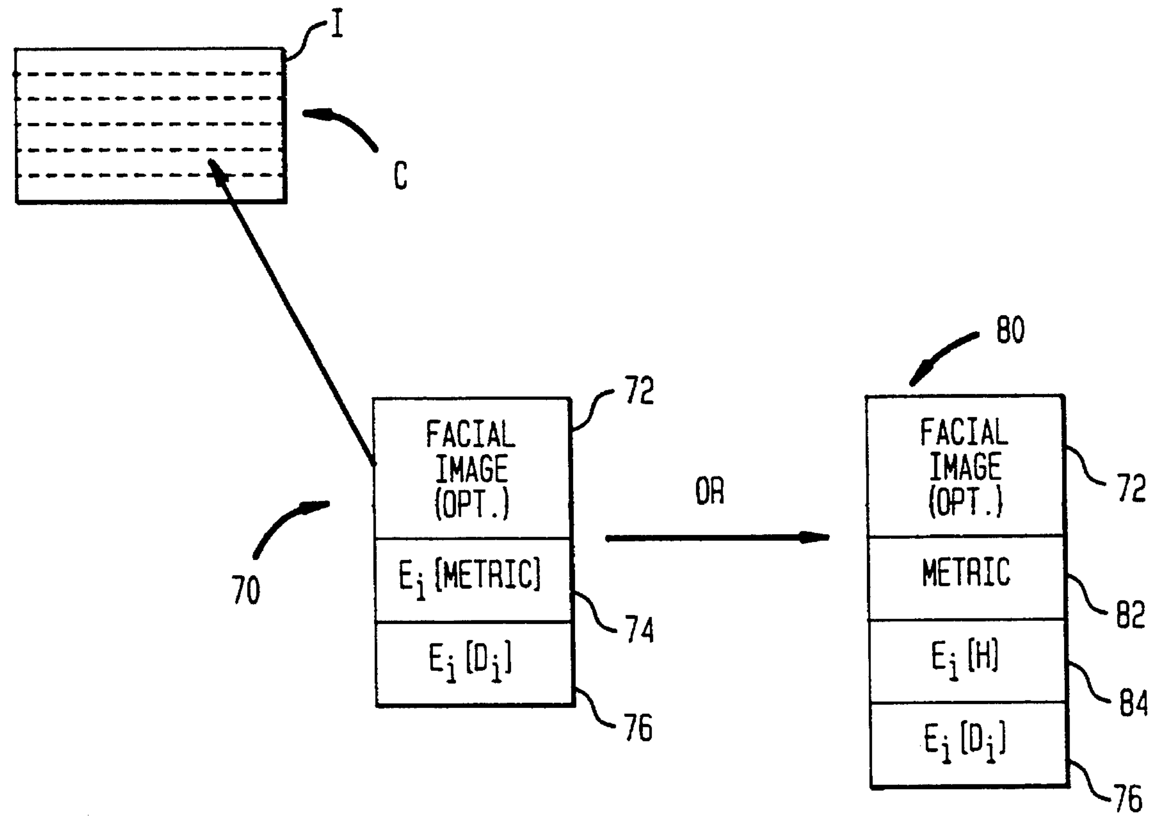
FIG. 5 shows a card with an indicia in accordance with the subject invention and data structures are presented by the indicia.

FIG. 5 shows a card C having indicia I printed on one side. Preferably conventional information such as photographs and textural information would be printed on the other side of card C. Indicia 1 are a scannable two dimensional bar code which is preferably printed in accordance with the PDF 417 standard or other suitable standard. In accordance with one embodiment of the subject invention indicia I represent a data structure 70 which optionally includes a facial image 72, as discussed above, and encrypted metric $E_i[M]$ and an encrypted decryption key $E_1[D_i]$.

In accordance with this embodiment the metric is encrypted with an encryption key, $E_i$, for a public key encryption system and the corresponding decryption key, $D_i$, is encrypted with another encryption key, $E_i$, for the system to form an encrypted decryption key $E_1[D_1]$. An apparatus in accordance with the subject invention stores a single decryption Key $D_1$, and, when it scans indicia I decrypts encrypted decryption $E_1[D_1]$ to recover decryption key $D_i$, which in turn is used to recover the metric which is then compared with the biometric of the person presenting the card C. A more detailed description of this procedure is set forth in co-pending, commonly assigned U.S. application Ser. No. 07/979,018 and is not believed necessary here for an understanding of the subject invention.

In another embodiment indicia represents data structure 80, which again optionally includes facial image 72, and include encrypted decryption key, $E_1[D_i]$. Data structure 80 also includes an unencrypted metric 82 and an encrypted hash of metric 82 (and possibly other information included in data structure 80), $E_i[H]$ 84. In this embodiment the apparatus according to the subject invention again recovers decryption key $D_i$, as described above, and decrypts the encrypted hash, $E_i[H]$ and also regenerates hash H from metric 82. If the decrypted and regenerated hashes match metric 82 is validated and can then be compared to the scanned biometric, as will be described further below. This embodiment of the subject invention allows the identification card C to be used by a person who does not have access to an apparatus in accordance with the subject invention, though with a lesser degree of assurance.

Figure 6:
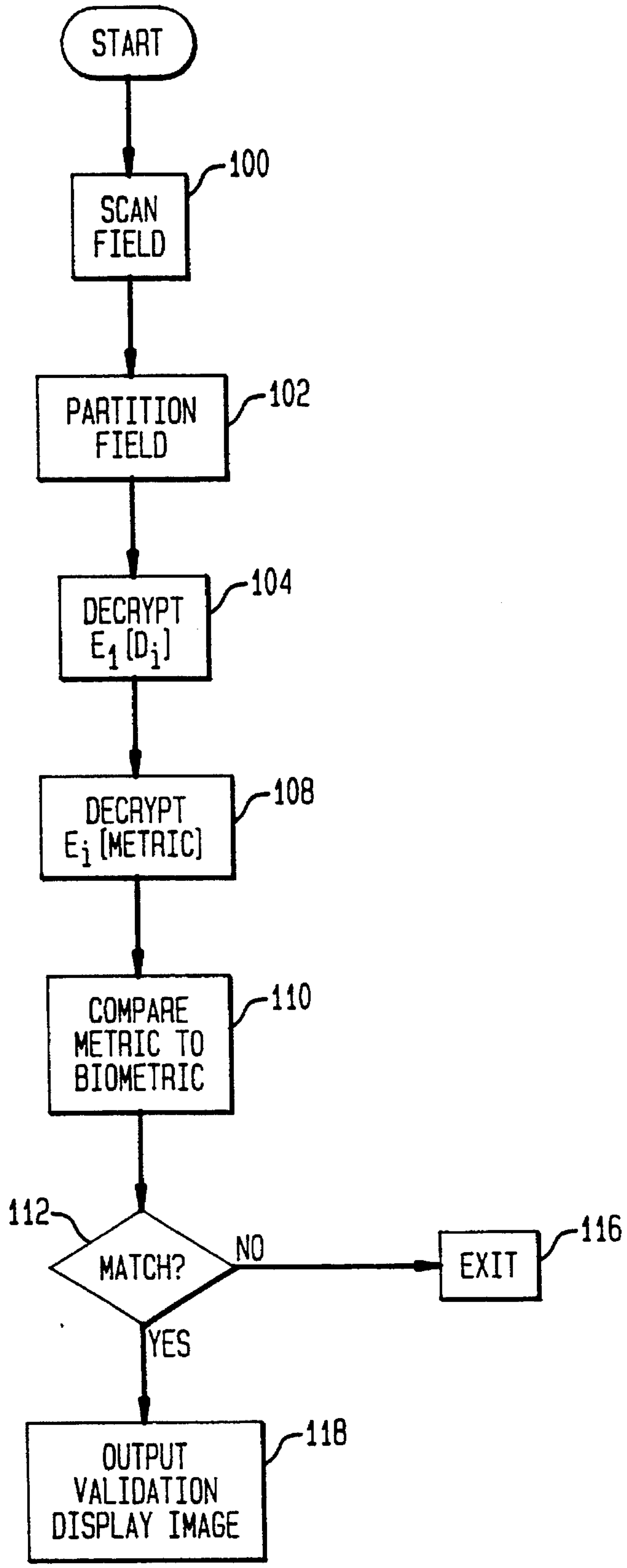
FIG. 6 shows the operation of the data processing apparatus in accordance with one embodiment of the subject invention.

FIG. 6 shows a flow diagram of the operation of apparatus 10 or apparatus 50 in validating an identification card and the identity of a person presenting that card in accordance with the subject invention. At 100 data processor 36 controls scanning mechanism 12 or 52 to scan field 14 or 54, depending upon whether low speed scanning apparatus 10 or high speed scanning apparatus 50 is used. At 102 data processor 36 partitions the scanned image representing the field into first and second sub-images representing the first field which includes indicia I and the second field which includes the appropriate biometric for the person presenting the card. At 104 data processor 36 recovers the encrypted decryption key, $E_1[D_i]$, and decrypts it to recover decryption key, $D_i$, using previously stored, corresponding decryption key, $D_1$. Then at 108 data processor 36 uses key $D_i$ to decrypt encrypted metric $E_i[M]$, to recover the metric represented in indicia I.

At 110 the metric is compared to the scanned biometric represented in the second sub-image formed at 102. At t 12 data processor 36 determines if the scanned biometric matches the metric on the identification card, and if not exits at 116. If there is a match at 118 data processor 36 outputs a validation signal and, optionally, may display a facial image which iS included in indicia I.

Techniques for validating various biometric characteristics are well known. For example, the above mentioned above mentioned article *Vital Signs of Identity,* describes numerous commercially available systems for recognizing fingerprints, hand geometry and signatures. Thus a person of ordinary skill in the art could readily implement such recognition techniques and no further description of the manner of comparison used in particular embodiments of the subject invention is believed necessary for understanding of the subject invention.

Figure 7:
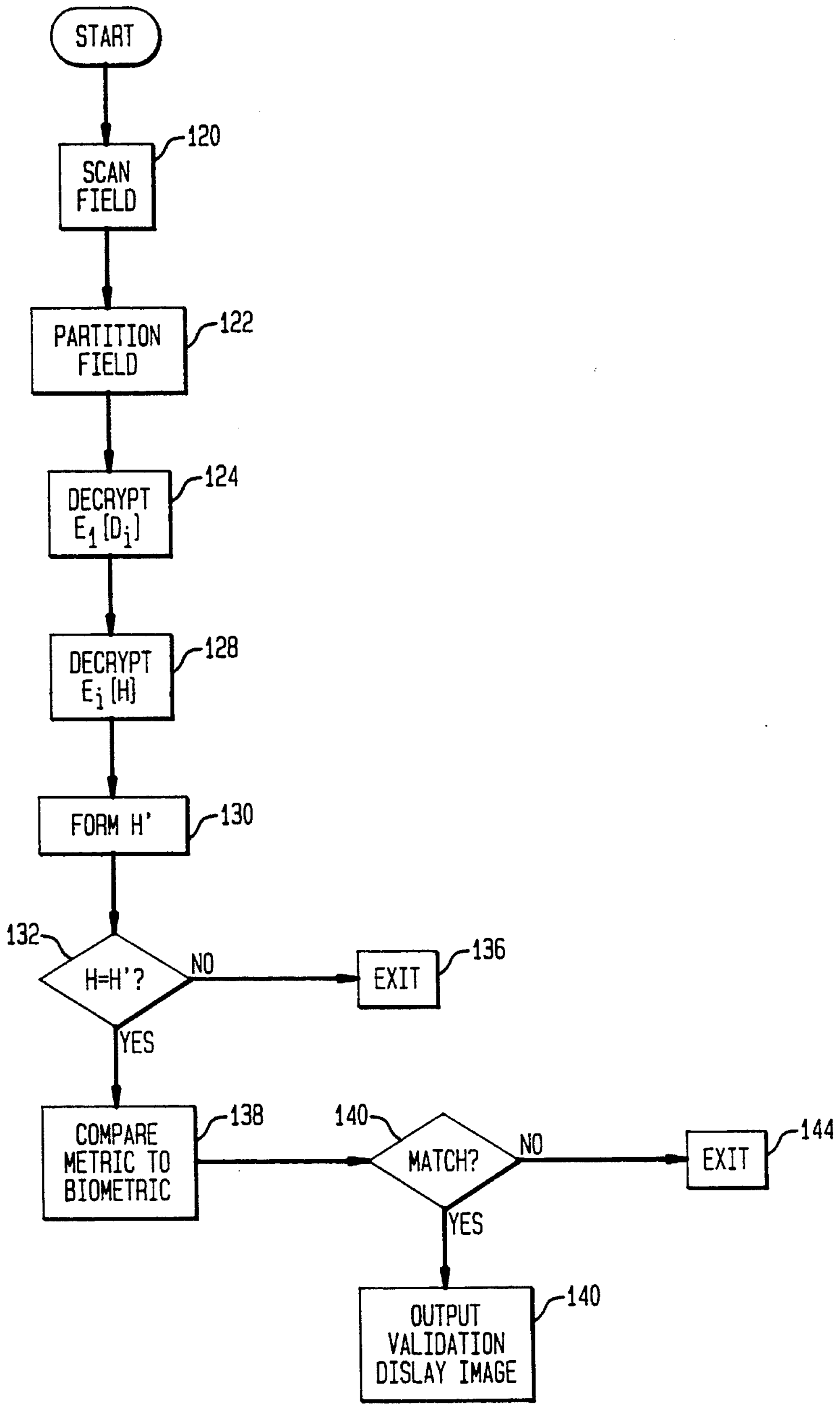
FIG. 7 shows the operation of the data processing apparatus in accordance with another embodiment of the subject invention.

FIG. 7 shows a flow diagram of the operation of data processor 36 in embodiments of the subject invention wherein the metric is validated by a digital signature.

At 120 data processor 36 scans field 14 or 54, again depending upon whether low speed scan apparatus 10 or high speed scan apparatus 50 is used. At 122 data processor 36 partitions the field, and at 124 recovers decryption key, $D_i$, as described above. At 128 key, Di is used to decrypt and encrypted hash $E_i[H]$ which is formed from the metric, and possibly other information, included in indicia I. Then at 130, data processor 36 regenerates Hash prime, and at 132 compares Hash to Hash Prime. If the comparison does not result in a match then the card may be assumed to be invalid and data processor 36 exits to an appropriate routine at 136.

At 138 data processor 36 compares the metric to the scanned, biometric, and at 140 exits to an appropriate subroutine if a match is not found. Otherwise, at 146 data processor 36 outputs a validation signal and, optionally, displays facial image 72.

Those skilled in the art will recognize that the embodiments described above are given by way of example only, and numerous other embodiments of the subject invention will be apparent to those skilled in the art from consideration of the detailed description set forth above and the attached drawings. Accordingly, limitations on the scope of the subject invention are to be found only in the claims set forth below.

What is claimed is:

1. A scanning subsystem for use in an apparatus for verifying an identification card and the identity of a person to be identified by said card, said card including scannable indicia representative of an encryption of a metric derived from a selected biometric of said person to be identified, said apparatus comprising:

a) a scanner for scanning a field, said field comprising first and second sub-fields;

b) first means for positioning said card so that said indicia lie within said first sub-field;

c) second means for positioning a correspondingly selected biometric characteristic of a person presenting said card within said second sub-field; and d) data processing means for:

d1) controlling said scanner to scan said field when said indicia and said correspondingly selected biometric are positioned within said first and second sub-fields respectively, d2) receiving a data image of said indicia and said correspondingly selected biometric from said scanner.

2. An apparatus for verifying an identification card and the identity of a person to be identified by said card, said card including scannable indicia representative of an encryption of a biometric derived from a selected metric of said person to be identified, said apparatus comprising:

a) a scamper for scanning a field, said field comprising first and second sub-fields;

b) first means for positioning said card so that said indicia lie within said first sub-field;

c) second means for positioning a correspondingly selected biometric characteristic of a person presenting said card within said second sub-field; and d) data processing means for:

d1) controlling said scanner to scan said field when said indicia and said correspondingly selected biometric are positioned within said first and second sub-fields respectively, d2) receiving a data image of said indicia and said correspondingly selected biometric from said scanner;

d3) partitioning said data image into first and second sub-images corresponding to said first and second sub-fields respectively;

d4) recovering said encryption from said first sub-image;

d5) decrypting said encryption to recover said metric and verify said card;

d6) comparing said second sub-image to said metric; mad d7) if said comparison is successful, outputting a sigmal indicating that said person presenting said card is said person to be identified by said card.

3. An apparatus as described in claim 2 wherein said biometric characteristic is a fingerprint.

4. An apparatus as described in claim 2 wherein said biometric characteristic is a signature.

5. An apparatus as described in claim 2 wherein said metric is encrypted with an encryption key, $E_i$, for a public key encryption system.

6. An apparatus as described in claim 5 wherein a decryption key, $D_i$, corresponding to said key, $E_i$, is encrypted with an encryption key $E_i$ to form an encrypted decryption key, $E_1[D_i]$, said key $E_1[D_i]$ is appended to said metric, and said data processing means is further for:

a) decrypting said encrypted decryption key, $E_l[D_i]$, with a corresponding decryption key, $D_1$ and, b) decrypting said metric with said corresponding key, $D_i$, to recover and validate said metric.

7. An apparatus as described in claim 2, wherein a digital signature of said metric is appended to said metric.

8. An apparatus as described in claim 7 wherein said digital signature is encrypted with an encryption key, El, for a public key encryption system.

9. An apparatus as described in claim 8 wherein a decryption key, $D_i$, corresponding to said key, $E_i$, is encrypted with an encryption key $E_1$ to form an encrypted decryption key, $E_1[D_i]$, and said encrypted decryption key, $E_1[D_i]$, is appended to said metric, and said data processing means is flirther for:

a) decrypting said encrypted decryption key, $E_1[D_i]$; and, b) decrypting said digital signature with said key, $D_i$, to recover said digital signature and validate said metric.

10. An apparatus as described in claim 2 further comprising means for transmitting messages to a remote facility.

11. An apparatus as described in claim 2 further comprising means for input of auxiliary data.

12. An apparatus as described in claim 2 further comprising a printer.

13. An apparatus as described in claim 2 wherein said indicia further include a representation of the facial image of said person to be identified, said apparatus further includes a display, and said data processing means is responsive to said representation of said facial image to control said display to display said representation.

* * * * *